(12) United States Patent
Dea (10) Patent No.: US 11,319,852 B2
(45) Date of Patent: May 3, 2022

(54) SYSTEMS AND METHODS FOR FLUID LEVEL AND QUALITY MEASUREMENT FOR REDUCTANT STORAGE SYSTEMS

(71) Applicant: Caterpillar Inc., Peoria, IL (US)

(72) Inventor: Kevin L. Dea, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 255 days.

(21) Appl. No.: 16/551,843

(22) Filed: Aug. 27, 2019

(65) Prior Publication Data

US 2021/0062701 A1 Mar. 4, 2021

(51) Int. Cl.
| | |
|---|---|
| *F01N 3/20* | (2006.01) |
| *B01D 35/027* | (2006.01) |
| *B01D 29/60* | (2006.01) |
| *B01D 29/90* | (2006.01) |
| *G01F 23/296* | (2006.01) |
| *G01F 23/2962* | (2022.01) |

(52) U.S. Cl.
CPC ......... *F01N 3/2066* (2013.01); *B01D 29/605* (2013.01); *B01D 29/90* (2013.01); *B01D 35/0276* (2013.01); *G01F 23/2962* (2013.01); *B01D 2201/287* (2013.01); *F01N 2610/1406* (2013.01); *F01N 2610/148* (2013.01); *F01N 2610/1426* (2013.01)

(58) Field of Classification Search
CPC combination set(s) only.
See application file for complete search history.

(56) References Cited

U.S. PATENT DOCUMENTS

| | | | |
|---|---|---|---|
| 9,248,390 B2 | 2/2016 | Hudgens et al. | |
| 9,535,038 B2 | 1/2017 | Reimer et al. | |
| 9,804,004 B1 | 10/2017 | Kruse et al. | |
| 9,897,477 B2 * | 2/2018 | Maguin | F01N 3/20 |
| 10,107,170 B2 * | 10/2018 | David | F01N 11/002 |
| 10,371,030 B2 * | 8/2019 | Kruse | F01N 3/206 |
| 2010/0050606 A1 * | 3/2010 | Fulks | F01N 11/00 60/286 |
| 2013/0104528 A1 * | 5/2013 | Chmielewski | F16L 53/34 60/286 |
| 2013/0313137 A1 * | 11/2013 | Madoux | F01N 3/00 206/216 |
| 2014/0334983 A1 * | 11/2014 | Yang | G01F 23/296 422/119 |
| 2015/0192051 A1 | 7/2015 | Ogawa et al. | |
| 2015/0198071 A1 | 7/2015 | Hudgens et al. | |

(Continued)

*Primary Examiner* — Binh Q Tran
(74) *Attorney, Agent, or Firm* — Bookoff McAndrews PLLC (57) ABSTRACT

A reductant storage system for an internal combustion engine system includes a storage container having a bottom wall, a top wall opposite the bottom wall, an opening extending through the top wall, and a reservoir formed by a hollow interior of the storage container; a filter assembly; and a header assembly. The filter assembly extends through the opening and is configured to seal the opening and includes a filtering material. The header assembly extends through the opening and inside the filter assembly. The header assembly includes: (i) a first sensor configured to measure a quality of the reductant contained within the filter assembly and (ii) a second sensor configured to measure a level of the reductant contained within the filter assembly.

20 Claims, 6 Drawing Sheets

(56) References Cited

U.S. PATENT DOCUMENTS

| | | | |
|---|---|---|---|
| 2015/0377112 A1* | 12/2015 | Ogawa | F01N 3/2066 |
| | | | 60/295 |
| 2016/0320349 A1 | 11/2016 | Murphy | |
| 2017/0074257 A1 | 3/2017 | Brusco et al. | |
| 2017/0122170 A1* | 5/2017 | Fahrenkrug | B01D 35/0276 |
| 2017/0189837 A1 | 7/2017 | Herold et al. | |

* cited by examiner

SYSTEMS AND METHODS FOR FLUID LEVEL AND QUALITY MEASUREMENT FOR REDUCTANT STORAGE SYSTEMS

TECHNICAL FIELD

The present disclosure relates generally to internal combustion engine systems, and more particularly, to systems and methods for fluid level and/or quality measurement in a reductant storage system used in an internal combustion engine.

BACKGROUND

Internal combustion engines are useful in various applications, including mobile machines and power generation. Internal combustion engines are commonly used in conjunction with one or more aftertreatment devices that receive exhaust from the engine and reduce an amount of undesired emissions such as nitrogen oxides (NOx). One exemplary aftertreatment device is a Selective Catalytic Reduction (SCR) device or SCR catalyst. SCR catalysts may react with NOx to produce nitrogen and water. However, this reaction also requires the presence of a reductant in the SCR catalyst. A storage system may be provided in communication with an aftertreatment system to inject a reductant liquid (e.g. urea) to the SCR catalyst. The reductant allows the SCR catalyst to react with NOx.

Various devices have been used to store reductant for delivery to an aftertreatment device via various reductant delivery systems. Reductant storage devices are periodically replenished with the reductant. In certain applications, such as mining, construction, farming and other field applications, reductant replenishment may be carried out in the work environment of the machine. Dirt and other debris may enter the reductant storage devices during operation in the work environment, especially during such refilling operations. Additionally, aeration, such as air bubbles, of the reductant may occur through slosh within the reductant storage devices. Such unwanted debris and aeration may impede accurate measurement of the quality and level of the reductant contained within the reductant storage devices.

An exemplary reductant storage device is disclosed in U.S. Pat. No. 9,804,004 B1 (the '004 patent) to Kruse. The reductant container disclosed in the '004 patent includes an upper opening into which a header assembly may be inserted. A sensor assembly configured to detect reductant concentration may be coupled to the '004 patent header assembly. A baffle formed of an impermeable material surrounds or encloses the header assembly including the sensor assembly in order to prevent air bubbles from entering the sensing volume. In addition to the baffle, the sensor assembly includes a cover assembly at least partially enclosing the sensing volume to prevent or reduce the number of air bubbles formed within the baffle from entering the sensing volume.

While the reductant container described in the '004 patent may be useful in some circumstances, it may allow dirt and debris introduced into the reductant container through, for example, the filling port, to accumulate within the baffle. This dirt and other debris may cause blockage of the cover assembly which may negatively impact the reductant concentration measurements performed by the sensor assembly. Further, the '004 patent discloses that the baffle may be formed of a plastic or polymer. The rigid structure of the baffle may cause splashing or sloshing of reductant within the baffle which may produce air or gaseous bubbles, thereby necessitating another cover assembly at least partially enclosing the sensing volume for reductant concentration measurements.

The disclosed systems and methods may solve one or more of the problems set forth above and/or other problems in the art. The scope of the current disclosure, however, is defined by the attached claims, and not by the ability to solve any specific problem.

SUMMARY

In one aspect, a reductant storage system for an internal combustion engine system may include a storage container having a bottom wall, a top wall opposite the bottom wall, an opening extending through the top wall, and a reservoir formed by a hollow interior of the storage container; a filter assembly; and a header assembly. The filter assembly may extend through the opening and may be configured to seal the opening and include a filtering material. The header assembly may extend through the opening and inside the filter assembly. The header assembly may include: (i) a first sensor configured to measure a quality of the reductant contained within the filter assembly and (ii) a second sensor configured to measure a level of the reductant contained within the filter assembly.

In another aspect, a reductant storage system for an internal combustion engine system may include a storage container having a bottom wall, a top wall opposite the bottom wall, an opening extending through the top wall, and a reservoir formed by a hollow interior of the storage container; a filter assembly; and a header assembly. The filter assembly may extend through the opening and may be configured to seal the opening and include a filtering material. The header assembly may extend through the opening and inside the filter assembly. The header assembly may include an ultrasonic sensor configured to measure a quality of the reductant contained within the filter assembly.

In another aspect, a reductant storage system for an internal combustion engine system may include a storage container having a bottom wall, a top wall opposite the bottom wall, an opening extending through the top wall, and a reservoir formed by a hollow interior of the storage container; a filter assembly; and a header assembly. The filter assembly may extend through the opening and may be configured to seal the opening and include a filtering material. The header assembly may extend through the opening and inside the filter assembly. The header assembly may include an ultrasonic sensor configured to measure a level of the reductant contained within the filter assembly.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
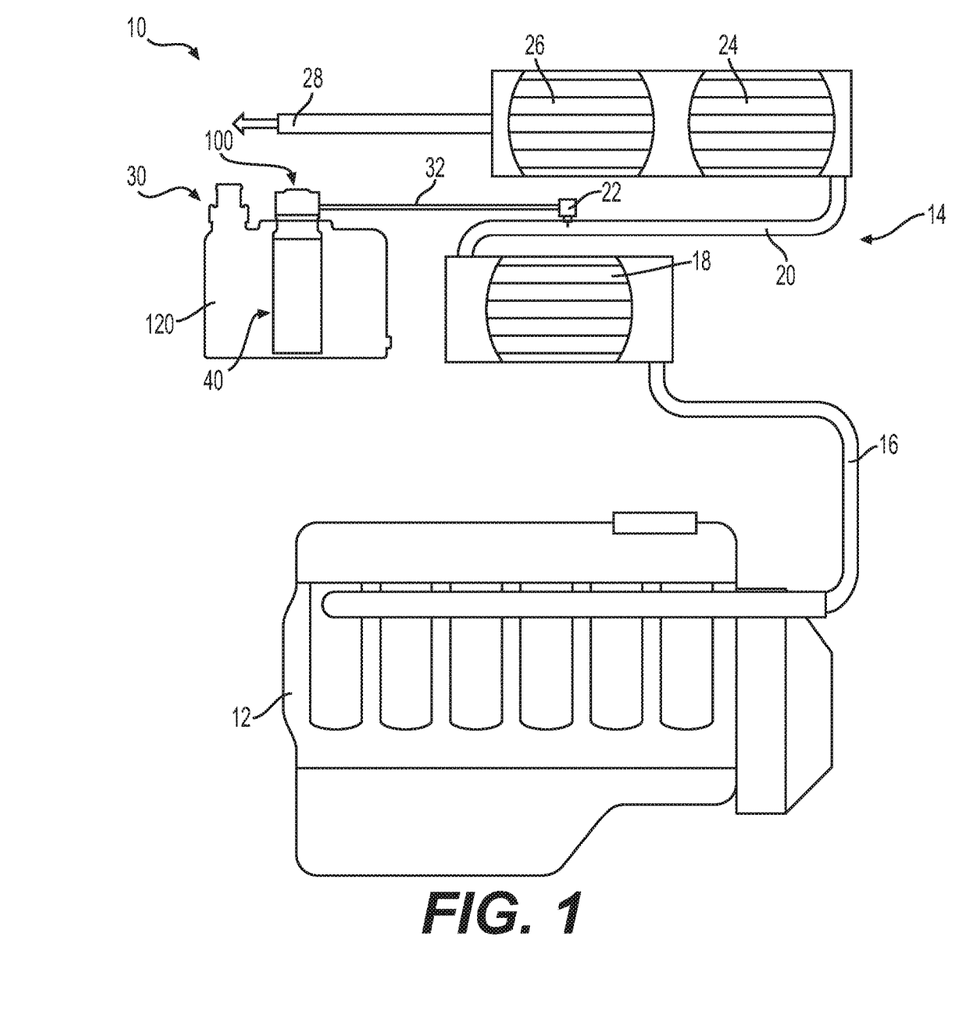
FIG. 1 is a schematic diagram illustrating an internal combustion engine system with a reductant storage system according to an aspect of the present disclosure.

FIG. 1 illustrates an internal combustion engine system 10 that may include an internal combustion engine 12 and an exhaust aftertreatment system 14 that receives and treats exhaust from internal combustion engine 12. While internal combustion engine 12 may be a diesel fuel driven internal combustion engine, any suitable type of combustion engine (e.g., gasoline, diesel, gaseous fuel, etc.) may be employed as internal combustion engine 12. Aftertreatment system 14 may include one or more aftertreatment devices 18, 24, 26 and one or more reductant storage systems 30. Exemplary aftertreatment devices 18, 24, 26 may include diesel oxidation catalysts, particulate filters, and selective catalytic reduction (SCR) catalysts. First aftertreatment device 18 may be connected downstream of internal combustion engine 12 via a first exhaust passage 16. Second and third aftertreatment devices 24, 26 may be in fluid communication with, and downstream of, first aftertreatment device 18 via a second exhaust passage 20. A third exhaust passage 28 may extend downstream of second and third aftertreatment devices 24, 26, and may include one or more suitable passages for guiding treated exhaust gas to an outlet. The first, second, and third aftertreatment devices 18, 24, 26 may be connected in series with respect to a path of exhaust produced by engine 12.

First aftertreatment device 18 of aftertreatment system 14 may include a particulate filter and may be connected to internal combustion engine 12 via first exhaust passage 16. A second exhaust passage 20 may be provided downstream of first aftertreatment device 18 and may extend to one or more additional aftertreatment devices, such as second aftertreatment device 24 and third aftertreatment device 26. Second aftertreatment device 24 may include an SCR catalyst. Third aftertreatment device 26 may include an oxidation catalyst such as an ammonia oxidation catalyst, or another suitable aftertreatment device. Third aftertreatment device 26 may be provided in a common housing with second aftertreatment device 24, as shown in FIG. 1, or may be provided in a separate housing.

Reductant storage system 30 may form a containment, filtering, and heating device for reductant that includes a storage container 120, a header assembly 100, and a filter assembly 40. Storage container 120 may be any suitable containment device that forms a reservoir for liquid reductant. As used herein, the reductant (also known as a diesel exhaust fluid (DEF)) may include urea or any other appropriate fluid. Filter assembly 40 may extend within storage container 120 and may provide a seal at an upper opening of storage container 120, as described below. Reductant storage system 30 may be connected to second exhaust passage 20 via a reductant (DEF) injector 22 and a reductant supply passage 32. Reductant injector 22 may be provided at a distal end of reductant supply passage 32 and secured to second exhaust passage 20. One or more reductant pumps (not shown) may be provided in reductant supply passage 32 to pump reductant from storage system 30 to reductant injector 22.

Figure 2:
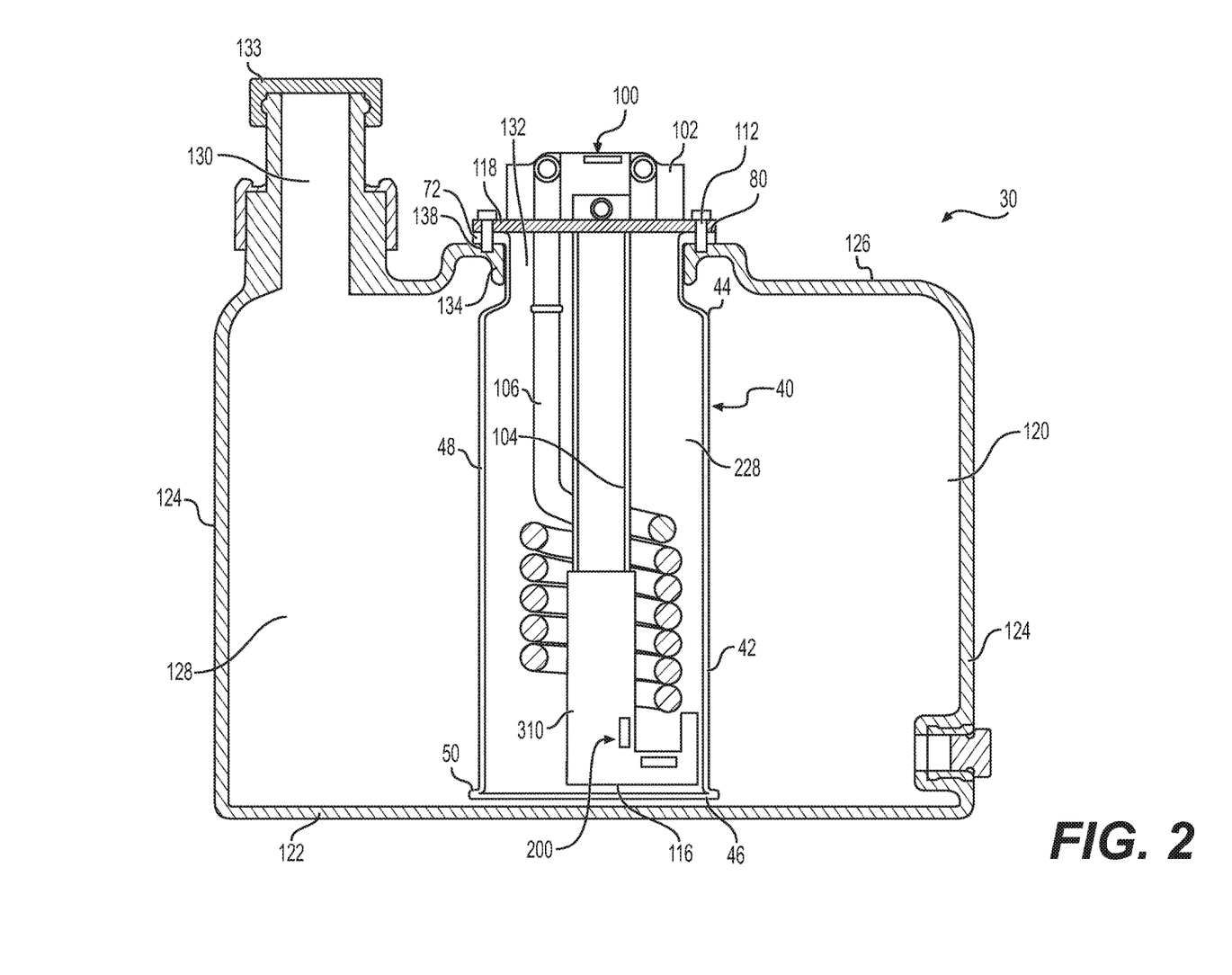
FIG. 2 is a cross-sectional view of the reductant storage system shown in FIG. 1 including a sensor assembly and a filter assembly.

FIG. 2 is a cross-sectional view illustrating reductant storage system 30, including filter assembly 40, a header assembly 100, and storage container 120 in an assembled state. Storage container 120 may include a bottom wall 122, side walls 124, and a top wall 126 that together define reservoir 128 for containing reductant. When assembled, an upper or proximal end 80 of filter assembly 40 may extend outside of this reservoir 128 of container 120, while a distal or lower end 46 may extend within reservoir 128 to a position adjacent to bottom wall 122. Header assembly 100 may be removably fixed to the storage container 120 and may include one or more components extending within reservoir 128. For example, header assembly 100 may include components to monitor, heat, and outlet reductant, as will be described in more detail below.

Storage container 120 may have any appropriate shape, such as a fuel-can (rectangular) shape as shown. Container 120 may include a filling opening 130 to receive a supply of reductant to be stored in reservoir 128, and the filling opening 130 may be sealed with a removable cap 133. Top wall 126 may include a header opening 132 sized to receive both filter assembly 40 and header assembly 100. Opening 132 may be defined and surrounded by a rim 134 formed as an embossed portion of top wall 126.

Filter assembly 40 may be secured to and extend through opening 132 and within reservoir 128. Filter assembly 40 may include a filter or filtering material 42, which may form a bag-type filter. Filtering material 42 may have a generally cylindrical or tubular shape, including a tubular filter body 48 that has a diameter larger or smaller than a diameter of opening 132. A proximal or upper end 44 of filtering material 42 may form an open end for receiving header assembly 100. The distal or bottom end 46 of filtering material 42 may form a closed end 50. Filtering material 42 may be any appropriate filtering media, such as polypropylene felt fabric or material, that is freely permeable to reductant while blocking passage of contaminants, such as dirt, particulates, and other debris, and collapsing any aeration, such as air bubbles formed through slosh, in the reductant. The cylindrical interior space of tubular filter body 48 provides a filtered reservoir 228 containing filtered reductant, i.e., reductant that has flowed through filtering material 42 and disposed within the cylindrical interior space at any given time, within the reservoir 128. The smaller volume of the filtered reservoir 228 relative to the reservoir 128 may reduce the likelihood of air bubbles forming in the reductant currently disposed in the filtered reservoir 228 through slosh.

Header assembly 100 may include a header 102 having a header flange 118 configured to cover opening 132 and close the open end of filter assembly 40 at flange 72. Header 102 may form a proximal or upper end of header assembly 100 and may be removably securable (e.g., with bolts) to flange 72 via header attachment holes 112 that align with holes 138 of storage container 120. Components of header assembly 100 that extend into reservoir 128 may include a reductant outlet pipe 104 and heater conduit 106. Header assembly 100 may also include a sensor assembly 200 within filtered reservoir 228, as will be described in further detail below. Header 102 may include an outlet in communication with reductant injector 22 (and outlet pipe 104), as well as inlet and outlet passages to supply coolant for heater conduit 106. For clarity, only one coolant passage 106 is shown in FIG. 2.

When header assembly 100 is secured to storage container 120, reductant outlet pipe 104 may extend from header 102 to a distal or bottom portion of reservoir 128. A distal end of reductant outlet pipe 104 may include an inlet opening 116 configured to draw reductant from within reservoir 128. The sensor assembly 200 may be secured to the distal end of the reductant outlet pipe 104. When header assembly 100 is secured to storage container 120, reductant outlet pipe 104 and sensor assembly 200 may extend to a position adjacent to distal end 46 of filter assembly 40. Components of header assembly 100 that extend into reservoir 128, e.g., reductant outlet pipe 104, heater conduit 106, and sensor assembly 200, are enclosed by filter assembly 40. Filtering material 42, which is freely permeable to reductant, helps to block passage of contaminants, such as dirt, particulates, and other debris, and reduces aeration such that a relatively cleaner sample of the reductant may be measured by the sensor assembly 200 disposed within the filter assembly 40.

Figure 3:
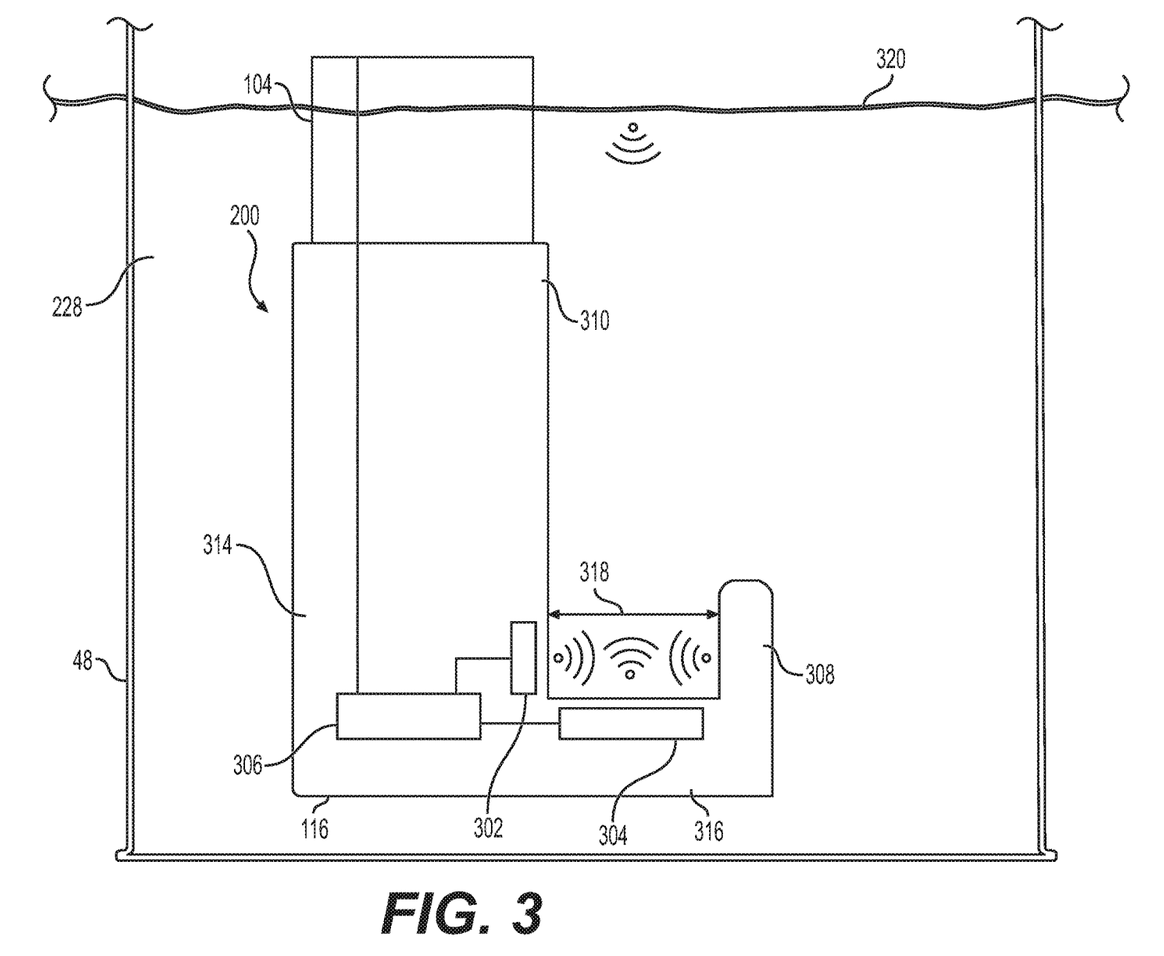
FIG. 3 is a view of the sensor assembly shown in FIG. 2.

FIG. 3 is a side view illustrating sensor assembly 200 submerged in the filtered reservoir 228. The sensor assembly 200 may include a casing 310 configured to encase and secure a fluid quality sensor 302 and a level sensor 304 in a fixed position. The casing 310 may have an L-shape, as shown, including a vertical portion 314 and a lateral extension 316. The casing 310 may be formed of any appropriate material, such as plastic and silicon. As shown in FIG. 3, the distal or bottom end of the reductant outlet pipe 104 may be inserted into the vertical portion 314 of the casing 310 such that the reductant outlet pipe 104 extends into the vertical portion 314 of the casing 310. The outlet pipe 104 may extend through casing 310 to a bottom surface of the casing 310, or casing 310 may include a vertically extending passage communicating the bottom surface of the casing 310 with outlet pipe 104. As shown in FIG. 3, the fluid quality sensor 302 and the level sensor 304 are disposed at a distal end of the header assembly. As such, the fluid quality sensor 302 and the level sensor 304 may be disposed at positions distal to the heater conduit 106. The fluid quality sensor 302 and the level sensor 304 are received in and located within the casing 310, as will described in further detail below.

The lateral extension 316 of the casing 310 may extend horizontally, e.g. at an angle approximately perpendicular to the vertical portion 314. The lateral extension 316 may extend to adjacent filter body 48, and thus may extend laterally beyond an edge of rim 134 of opening 132 in storage container 120. The lateral extension 316 includes a reflector 308 protruding vertically upwards from a lateral end of the lateral extension 316. In some embodiments, the reflector 308 extends parallel to the reductant outlet pipe 104 and vertical portion 314. A surface of the reflector 308 facing the vertical portion 314 of the casing 310 may be located at a predetermined distance 318 from the fluid quality sensor 302, where the fluid quality sensor 302 may be positioned within the vertical portion 314 and facing the reflector 308 as shown in FIG. 3. The fluid quality sensor 302 may be positioned at an outer surface of the vertical portion 314. The fluid quality sensor 302 may be an ultrasonic sensor including a transceiver, e.g., an oscillator, configured to emit and receive ultrasonic waves. The transceiver may be configured to emit ultrasonic waves at various frequencies towards the reflector 308. Subsequently, the transceiver may be configured to receive the ultrasonic waves reflected off of the reflector 308. The fluid quality sensor 302 may determine the concentration, i.e., the quality, of the filtered reductant based on one or more of the predetermined distance 318, time it took for the fluid quality sensor 302 to receive a reflected ultrasonic wave after emission, and the frequency of the emitted ultrasonic wave. In some embodiments, the quality sensor may be an infrared sensor. The location of the fluid quality sensor 302 within the casing 310 as described herein is for ease of explanation, and it is understood that the location of the fluid quality sensor 302 within the casing 310 may be adjusted in alternative embodiments.

The level sensor 304 may be located within the lateral extension 316. As shown in FIG. 3, the level sensor 304 may be positioned at a top surface of the lateral extension 316. The level sensor 304 may be an ultrasonic sensor including a transceiver, e.g., an oscillator, configured to emit and receive ultrasonic waves. The transceiver may be configured to emit ultrasonic waves at various frequencies towards a surface 320 of the filtered reductant. Subsequently, the transceiver may be configured to receive the ultrasonic waves reflected off of the surface 320. The level sensor 304 may determine the level, i.e., the distance from the level sensor to the surface 320, of the filtered reductant based on one or more of the time it took for the level sensor 304 to receive a reflected ultrasonic wave after emission and the frequency of the emitted ultrasonic wave. The level sensor 304 may be located offset (e.g. circumferentially offset with respect to outlet pipe 104) from the fluid quality sensor 302 such that the ultrasonic waves emitted and received by the level sensor 304 do not interfere with the ultrasonic waves emitted and received by the fluid quality sensor 302. The location of the level sensor 304 within the casing 310 as described herein is for ease of explanation, and it is understood that the location of the level sensor 304 within the casing 310 may be adjusted in alternative embodiments.

The sensor assembly 200 may include a sensor controller 306 configured to provide power to the fluid quality sensor 302 and the level sensor 304. The sensor controller 306 may be located in the casing 310 (within vertical portion 314 or lateral extension 316), as shown in FIG. 3, or alternatively, the controller 306 may be located in the header 102 of header assembly. The sensor controller 306 may receive and analyze the measurements obtained by the fluid quality sensor 302 and the level sensor 304 and output the analyzed measurements to other components, such as an external controller or other control unit (not shown). In some embodiments, the sensor controller 306 may merely receive the measurements from the fluid quality sensor 302 and the level sensor 304 and transmit the received measurements to the external controller or other control unit for further analysis. For example, sensor controller 306 may be in electrical communication with a controller or other control units located in the header 102 (hereinafter referred to as the "header controller"). Accordingly, the sensor controller 306 may transmit data regarding the obtained measurements from the fluid quality sensor 302 and the level sensor 304 to the header controller. The sensor controller 306 may receive information regarding data transmission scheduling and power control for the fluid quality sensor 302 and the level sensor 304 from the header controller.

In some embodiments, the sensor controller 306 may be in electrical communication with an engine control unit (not shown) of the internal combustion engine system 10. The engine control unit may be configured to make determinations based on information from the sensor controller 306 regarding the quality and/or level of the reductant. For example, the engine control unit may compare the detected quality of the reductant to a predetermine threshold and determine whether the reductant needs to replaced or serviced, e.g., filtered, based on the comparison. As another example, the engine control unit may compare the detected level of the reductant to a predetermined threshold and determine whether additional reductant needs to provided based on the comparison.

Figure 4:
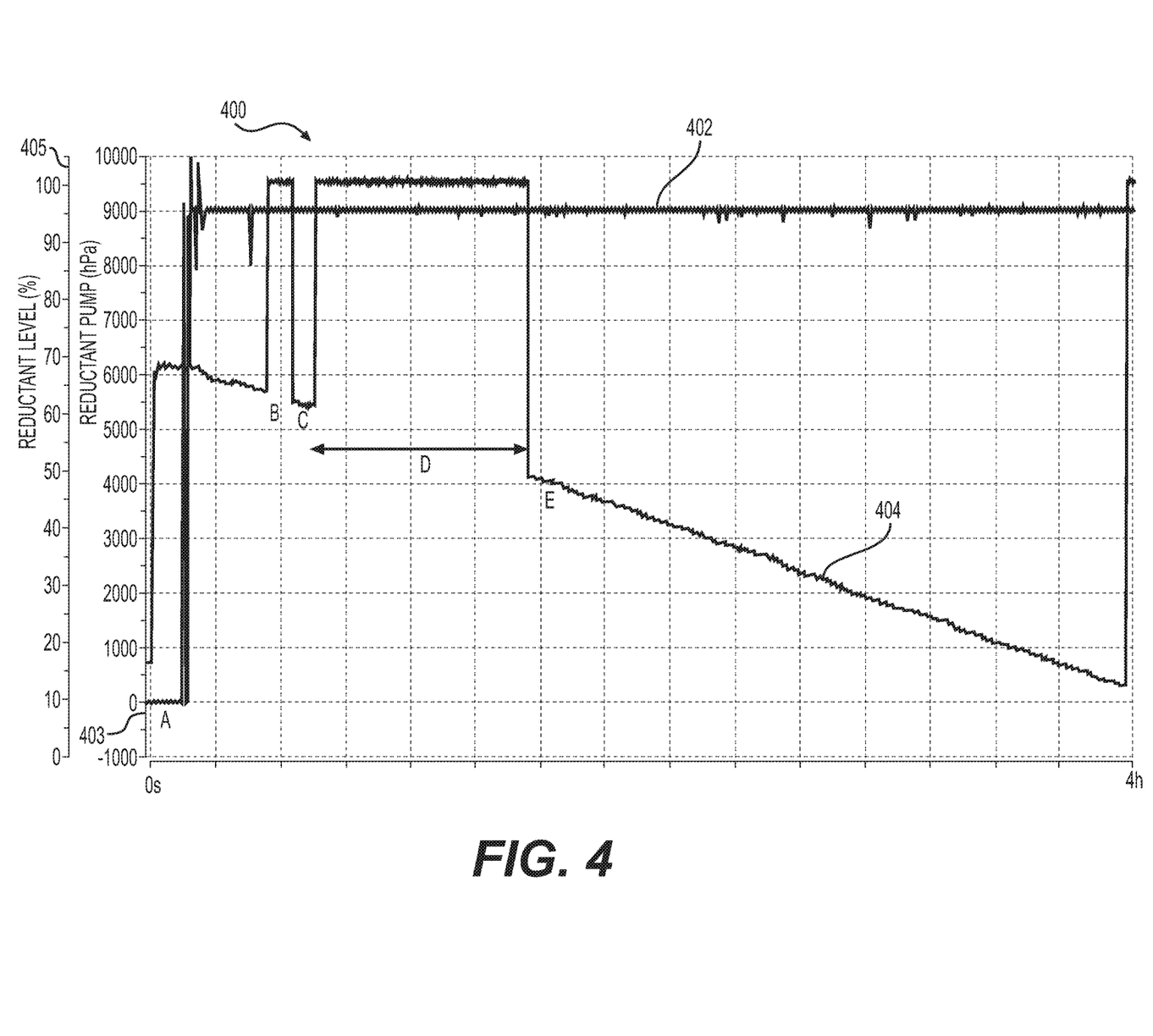
FIG. 4 shows test results of level measurement within the reductant storage system without the filter assembly.
Figure 5:
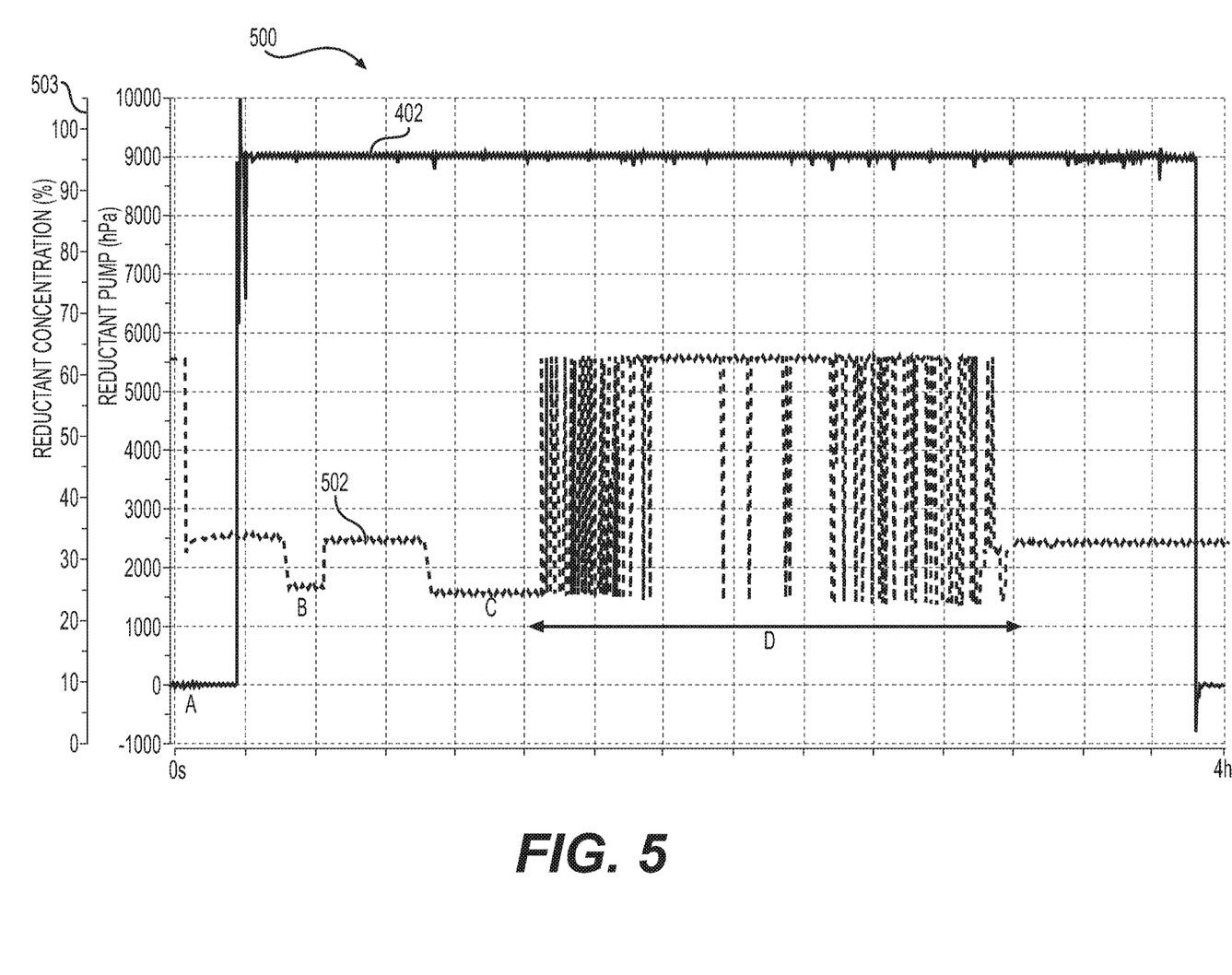
FIG. 5 shows test results of quality measurement within the reductant storage system without the filter assembly.
Figure 6:
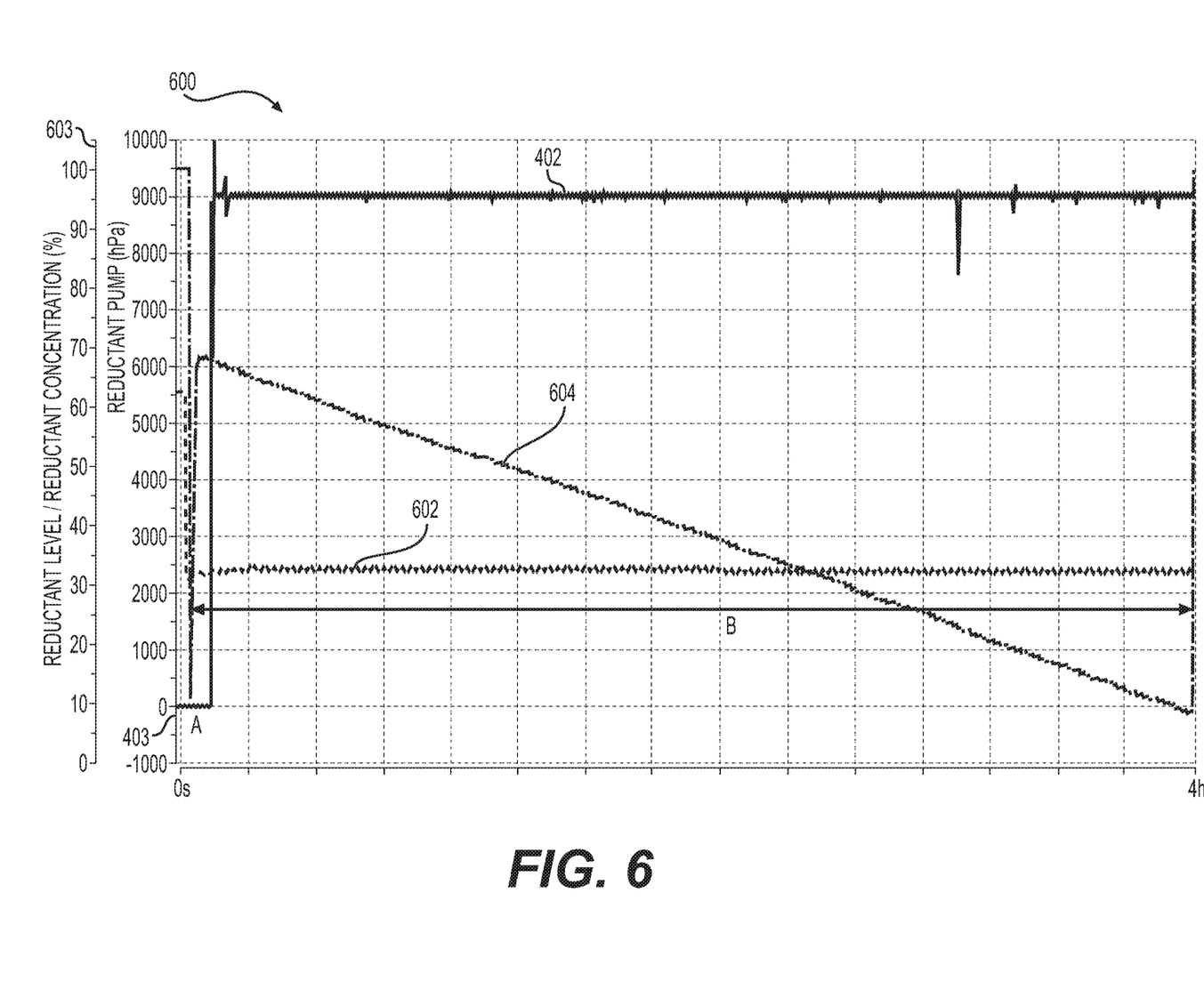
FIG. 6 shows simulation results of quality and level measurements within the reductant storage system with the filter assembly.

FIGS. 4-6 show test results of reductant level and quality measurements within storage container 120 with and without filter assembly 40.

FIG. 4 shows a test result of reductant level measurements within storage container 120 without the filter assembly 40 via the level sensor as described herein. For the purpose of the test, the storage container 120 is filled with reductant to approximately 75% and 45 mg/L of A2 fine dust is mixed in with the reductant. Further, there is provided an impeller style agitator used to keep debris, e.g., the fine dust, in suspension within the reductant and drive fluid dynamics, e.g., create slosh and aeration, within the storage container 120. Chart 400 shown in FIG. 4 includes pressure graph 402 indicating the pressure at which reductant is being pumped from the storage container 120 via outlet pipe 104 and level measurement graph 404 indicating the measured level of the reductant in the storage container 120. The y-axis labeled Reductant Pump 403 corresponds to pressure graph 402 and the y-axis labeled Reductant Level 405 corresponds to level measurement graph 404. The x-axis indicates the time of the test. At point A, at approximately 15 minutes, reductant pump from the storage container 120 is initiated. At point B, at approximately 33 minutes, the reductant measurement level signal is lost due to the reductant aeration and debris. At point C, the reductant measurement level signal is momentarily recovered. During time period D, reductant measurement level signal is lost for approximately 45 minutes. After point E, after about 1.5 hours into the test, the reductant measurement level signal is recovered. This may be due to improved signal to noise based on the lower reductant level within the storage container 120.

FIG. 5 shows test results of reductant concentration measurements, i.e., quality measurements, within storage container 120 without the filter assembly 40 via the quality sensor as described herein. For the purpose of the test, the storage container 120 is filled with reductant of approximately 32.5% concentration and 45 mg/L of A2 fine dust is mixed in with the reductant. Further, there is provided an impeller style agitator used to keep debris, e.g., the fine dust, in suspension within the reductant and drive fluid dynamics, e.g., create slosh and aeration, within the storage container 120. Chart 500 shown in FIG. 5 includes pressure graph 402 indicating the pressure at which reductant is being pumped from the storage container 120 via outlet pipe 104 and a concentration measurement graph 502 indicating the measured concentration of the reductant in the storage container 120. The y-axis labeled Reductant Pump 403 corresponds to pressure graph 402 and the y-axis labeled Reductant Concentration 503 corresponds to concentration measurement graph 502. The x-axis indicates the time of the test. At point A, at approximately 15 minutes, reductant pump from the storage container 120 is initiated. At point B, reductant aeration and debris causes an approximately 8% shift in the measured concentration. At point C, reductant aeration and debris causes another approximately 8% shift in the measured concentration. During time period D, reductant aeration and debris causes a failure to measure the reductant concentration.

FIG. 6 shows test results of reductant level and quality measurements within storage container 120 with filter assembly 40 via the level sensor and the quality sensor as described herein. For the purpose of the test, the storage container 120 is filled with the reductant to approximately 75%, where the reductant has a concentration of about 32.5%. 45 mg/L of A2 fine dust is mixed in with the reductant. Further, there is provided an impeller style agitator used to keep debris, e.g., the fine dust, in suspension within the reductant and drive fluid dynamics, e.g., simulate slosh and aeration, within the storage container 120. Chart 600 shown in FIG. 6 includes pressure graph 402 indicating the pressure at which reductant is being pumped from the storage container 120 via outlet pipe 104, concentration measurement graph 602 indicating the measured concentration of the reductant in the storage container 120, and level measurement graph 604 indicating the measured level of the reductant in the storage container 120. The y-axis labeled Reductant Pump 403 corresponds to pressure graph 402 and the y-axis labeled Reductant Level/Reductant Concentration 603 corresponds to concentration measurement graph 602 and level measurement graph 604. The x-axis indicates the time of the test. At point A, at approximately 10 minutes, reductant pump from the storage container 120 is initiated.

As opposed to the measured concentration and level shown in FIGS. 4-5, during time period B (i.e., the entire duration of the test), there is little deviation in the concentration measurement 602 and level measurement 604 of the reductant in the storage container 120. That is, measuring the quality and level of the reductant within filter assembly 40 as described herein may provide consistent, accurate, and reliable measurements.

It will be apparent to those skilled in the art that various modifications and variations can be made to the disclosed apparatus and system without departing from the scope of the disclosure. Other embodiments of the apparatus and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A reductant storage system for an internal combustion engine system, comprising:
  a storage container having a bottom wall, a top wall opposite the bottom wall, an opening extending through the top wall, and a reservoir formed by a hollow interior of the storage container;
  a filter assembly extending through the opening, wherein the filter assembly is configured to seal the opening and includes a filtering material; and
  a header assembly extending through the opening and inside the filter assembly, wherein the header assembly includes: (i) a first sensor configured to measure a quality of the reductant contained within the filter assembly and (ii) a second sensor configured to measure a level of the reductant contained within the filter assembly.

2. The reductant storage system of claim 1, wherein the first sensor is an ultrasonic sensor or an infrared sensor, and wherein the second sensor is an ultrasonic sensor.

3. The reductant storage system of claim 1, wherein the header assembly comprises a reflector positioned at a predetermined distance from the first sensor.

4. The reductant storage system of claim 3, wherein the first sensor comprises a transceiver configured to: (i) transmit a signal towards the reflector and (ii) receive the signal reflected off of the reflector.

5. The reductant storage system of claim 4, wherein the header assembly comprises a reductant outlet pipe, and wherein the reflector extends parallel to the reductant outlet pipe.

6. The reductant storage system of claim 1, wherein the second sensor comprises a transceiver configured to: (i) transmit a signal towards a surface of the reductant contained within the filter assembly and (ii) receive the signal reflected off of the surface of the reductant contained within the filter assembly.

7. The reductant storage system of claim 1, wherein the first and second sensors are disposed at a distal end of the header assembly.

8. The reductant storage system of claim 1, wherein the header assembly includes a distal casing, and wherein the first and second sensors are received in the distal casing.

9. The reductant storage system of claim 7, wherein the distal casing includes a lateral extension, and wherein the second sensor is located within the lateral extension.

10. The reductant storage system of claim 7, wherein the lateral extension extends laterally beyond a lateral edge of the opening in the storage container.

11. A reductant storage system for an internal combustion engine system, comprising:
a storage container having a bottom wall, a top wall opposite the bottom wall, an opening extending through the top wall, and a reservoir formed by a hollow interior of the storage container;
a filter assembly extending through the opening, wherein the filter assembly is configured to seal the opening and includes a filtering material; and
a header assembly extending through the opening and inside the filter assembly, wherein the header assembly includes an ultrasonic sensor configured to measure a quality of the reductant contained within the filter assembly.

12. The reductant storage system of claim 11, wherein header assembly comprises a reflector positioned at a predetermined distance from the sensor.

13. The reductant storage system of claim 12, wherein the ultrasonic sensor comprises a transceiver configured to: (i) transmit a signal towards the reflector and (ii) receive the signal reflected off of the reflector.

14. The reductant storage system of claim 12, wherein the header assembly comprises a reductant outlet pipe, and wherein the reflector extends parallel to the reductant outlet pipe.

15. The reductant storage system of claim 11, wherein the header assembly includes a distal casing, and wherein the ultrasonic sensor is received in the distal casing.

16. A reductant storage system for an internal combustion engine system, comprising:
a storage container having a bottom wall, a top wall opposite the bottom wall, an opening extending through the top wall, and a reservoir formed by a hollow interior of the storage container;
a filter assembly extending through the opening, wherein the filter assembly is configured to seal the opening and includes a filtering material; and
a header assembly extending through the opening and inside the filter assembly, wherein the header assembly includes a first ultrasonic sensor configured to measure a level of the reductant contained within the filter assembly, and a quality sensor configured to measure a quality of the reductant contained within the filter assembly, the quality sensor being a second ultrasonic sensor or an infrared sensor.

17. The reductant storage system of claim 16, wherein the first ultrasonic sensor comprises a transceiver configured to: (i) transmit a signal towards a surface of the reductant contained within the filter assembly and (ii) receive the signal reflected off of the surface of the reductant contained within the filter assembly.

18. The reductant storage system of claim 16, wherein the first ultrasonic sensor is disposed at a distal end of the header assembly.

19. The reductant storage system of claim 16, wherein the header assembly includes a distal casing, and wherein the first ultrasonic sensor is received in the distal casing.

20. The reductant storage system of claim 19, wherein the distal casing includes a lateral extension, and wherein the first ultrasonic sensor is located within the lateral extension.

* * * * *